US007839256B2

(12) United States Patent
Bradford et al.

(10) Patent No.: US 7,839,256 B2
(45) Date of Patent: Nov. 23, 2010

(54) HOT-STICK CAPABLE CUTOUT COVER

(75) Inventors: Lawrence E. Bradford, Sterrett, AL (US); Brian A. Naro, Bessemer, AL (US)

(73) Assignee: Hubbell Incorporated, Shelton, CT (US)

( * ) Notice: Subject to any disclaimer, the term of this patent is extended or adjusted under 35 U.S.C. 154(b) by 828 days.

(21) Appl. No.: 11/606,355

(22) Filed: Nov. 30, 2006

(65) Prior Publication Data

US 2008/0128163 A1 Jun. 5, 2008

(51) Int. Cl.
*H02B 1/06* (2006.01)
*H01B 17/58* (2006.01)
*H01B 7/00* (2006.01)

(52) U.S. Cl. ....................... 337/199; 337/168; 337/169; 337/186; 337/202; 361/601; 174/5 R; 174/135; 174/138 F

(58) Field of Classification Search ................ 337/169, 337/186, 199, 202, 168; 361/601; 174/135, 174/5 R, 138 F; 52/101; 49/58, 59; D13/156
See application file for complete search history.

(56) References Cited

U.S. PATENT DOCUMENTS 983,039 A * 1/1911 Field .......................... 174/139
2,576,238 A 11/1951 Rayburn
2,682,591 A * 6/1954 Killian ........................ 218/43
2,875,267 A * 2/1959 Sutton, Jr. ................... 174/139
3,079,457 A 2/1963 Newcomb
3,238,291 A * 3/1966 Bosch et al. ............. 174/138 F
3,270,120 A * 8/1966 Van Name et al. ............. 174/1
3,328,511 A 6/1967 Cagle et al.
3,639,678 A * 2/1972 Muschong .................. 174/145
3,639,681 A * 2/1972 Ettlinger .................. 174/138 F
3,824,676 A 7/1974 Ebert
D240,833 S 8/1976 Clutter et al.
D259,634 S 6/1981 Clutter
4,280,013 A 7/1981 Clutter
4,449,010 A 5/1984 Apperson et al.
4,845,307 A * 7/1989 Cumming et al. ........... 174/5 R
D357,458 S 4/1995 Tisbo
5,873,324 A 2/1999 Kaddas et al.
6,005,196 A 12/1999 Spillyards
6,098,348 A * 8/2000 Weaver ........................ 52/101
6,255,597 B1 7/2001 Bowling et al.
6,291,774 B1 9/2001 Williams
6,486,785 B1 * 11/2002 Hoth .......................... 340/584
6,683,249 B1 * 1/2004 Leppin ........................ 174/50
6,878,883 B1 * 4/2005 Rauckman .................. 174/135
6,963,025 B1 * 11/2005 Kysely ....................... 174/5 R
6,995,313 B1 * 2/2006 Barnett et al. ............... 174/5 R
7,075,015 B1 * 7/2006 Rauckman .................. 174/135
7,276,665 B1 * 10/2007 Rauckman .................. 174/135

(Continued)

*Primary Examiner*—Anatoly Vortman
(74) *Attorney, Agent, or Firm*—Jenae C. Gureff; Mark S. Bicks; Alfred S. Goodman

(57) ABSTRACT

A cutout cover includes an arcuate top portion covering an insulator having a closed top and an open bottom with a slit extending therebetween. A midsection can connect the top portion to an open end adapted to access the cutout. The top portion is bell-shaped with an upper and lower dome, two opposing sides, and a slit between the sides. A fastener mechanism is attached to the two opposing sides with an aperture disposed on each of the sides for receiving a fastener.

21 Claims, 8 Drawing Sheets

U.S. PATENT DOCUMENTS

| | | | | | |
|---|---|---|---|---|---|
| 7,297,869 | B2 * | 11/2007 | Hiller et al. | 174/40 R |
| 7,301,096 | B2 * | 11/2007 | Strong et al. | 174/5 R |
| 7,309,837 | B1 * | 12/2007 | Rauckman | 174/138 F |
| D580,878 | S * | 11/2008 | Milner | D13/156 |
| 7,622,668 | B1 * | 11/2009 | Tollefson et al. | 174/5 R |
| 2002/0117313 | A1 | 8/2002 | Spencer | |
| 2004/0184210 | A1 | 9/2004 | Lynch | |
| 2006/0164781 | A1 * | 7/2006 | Strong et al. | 361/118 |

* cited by examiner

HOT-STICK CAPABLE CUTOUT COVER

FIELD OF THE INVENTION

The present invention relates to a cutout cover for polymer and porcelain cutouts covering an electrical utility mechanism to protect wildlife from execution. More particularly, the invention relates to a flexible, yet sturdy cover, preferably having multiple hot-stick grab points and an integrated fastener mechanism installable with a hot-stick tool.

BACKGROUND OF THE INVENTION

When cutouts are installed in the field without a cover, they present a risk of electrical shock to wildlife and installers (linemen). Installations of most covers on the market require the removal of the stinger wire prior to installation. Some conventional covers can fit over a cutout without removing the stinger wire from the assembly, but those covers are multiple piece designs that must be installed while a lineman is wearing rubber gloves to protect against electrocution, thus requiring the lineman to be near the cutout via a ladder or bucket truck.

There are at least two examples of very rigid plastic covers (from Raychem and Eco Electric) that claim hot stick capabilities such that the stinger wire does not have to be removed and the device does not have to be rubber gloved.

Each of these designs has independent fasteners that the lineman must individually install by bringing the hot-stick to his level, capturing with the hot-stick, and then again reaching to the cutout to install. If multiple fasteners are needed, this process must occur more than one time. This presents two problems: (1) installation time is increased each time the installer must bring the end of the hot-stick back to his level, and (2) the level of difficulty of installing an independent (or loose) fastener with a hot-stick is much greater than installing an integral fastener.

Accordingly, a need exists for an improved cutout cover with minimal material that protects wildlife and guards against animal induced power outages. This improved cutout cover will have a simple, inexpensive yet elegant, design with a short installation time, and a low level of installation and manufacturing difficulty with preferably, hot-stick grab points that a lineman can control without risking physical damage.

SUMMARY OF THE INVENTION

Accordingly, an object of the invention is to provide a cutout cover having a living hinge for securing the sides of the cover together.

Another object is to provide a cutout cover having at least one grab point for connecting to a hot-stick tool so a lineman can remove the cover without risking electrical contact.

Still another object is to provide a flexible cutout cover that can withstand inclement weather without becoming dislodged atop the cutout.

Yet another object is to provide a cover having a fastener mechanism securing first and second sides of the cover that are separated by a slit adjacent a living hinge.

A further object of the invention is to provide a fastener mechanism between the two sides of the cover where (1) one of the sides includes a keyhole shaped aperture with more than one radii for providing a secure locking relationship between the two sides of the cover and (2) the other includes a fastener receiving aperture with a radius larger than the smaller radius of the first side.

Still another object is to provide a fastener mechanism between the two sides of the cover where the fastener is a push pin inserted into one side of the cover.

Another object is to provide a cover of reduced size for covering mainly the upper section of the insulator without compromising the effectiveness of the insulator.

Yet another object is to provide a cover having an open end that is either curved or substantially square.

The foregoing objects are basically attained by providing a cutout cover comprising a hollow top portion covering an insulator having a closed top and an open bottom with a slit extending through the top portion. A midsection connects the top portion to an open end adapted to access the cutout. The top portion is bell-shaped with an upper and lower dome, two opposing sides, and a slit extending through the domes. In a preferred embodiment, a hot-stick capable fastener is attached to the two opposing sides with an aperture disposed on each of the sides for receiving a fastener with a cone-shaped head to secure the sides of the cover together. Hot-stick features are included on the cover for a lineman to grab and install onto the cutout with a hot-stick tool. In another preferred embodiment, a fastener is pre-installed on one side of the cover for inserting into the second side of the cover.

By forming the cutout cover in this manner, a user can install the cover with rubber gloves if the cover does not have a hot-stick capable fastener and secure the cover to the cutout with the fastener mechanism engaging both sides adjacent to the slit extending through the domes.

As used in this application, the terms “top”, “bottom”, and “side” are intended to facilitate the description of the invention, and are not intended to limit the present invention to any particular orientation.

Other objects, advantages, and salient features of the invention will become apparent from the following detailed description, which, taken in conjunction with annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
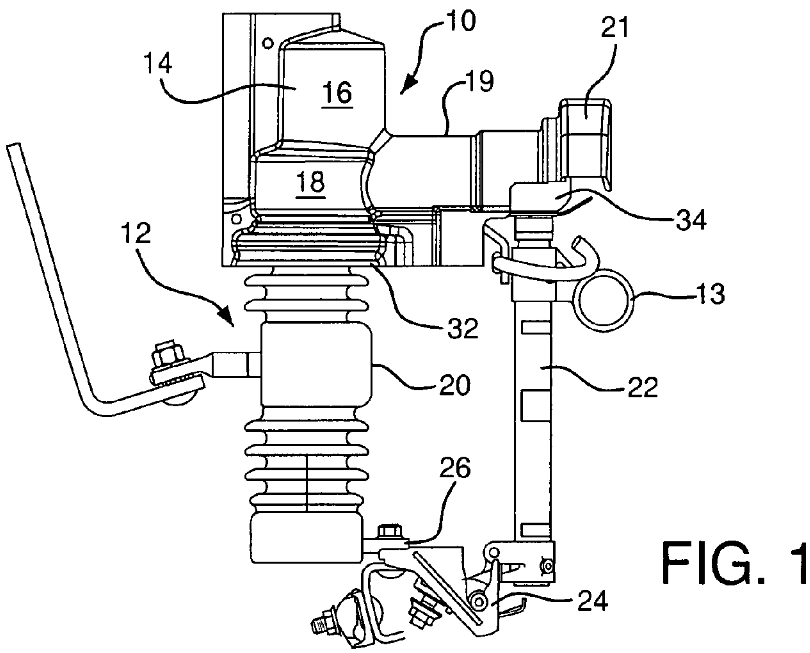
FIG. 1 is a side elevational view of the full hot-stick capable cutout cover on a conventional cutout according to a first embodiment of the invention.
Figure 2:
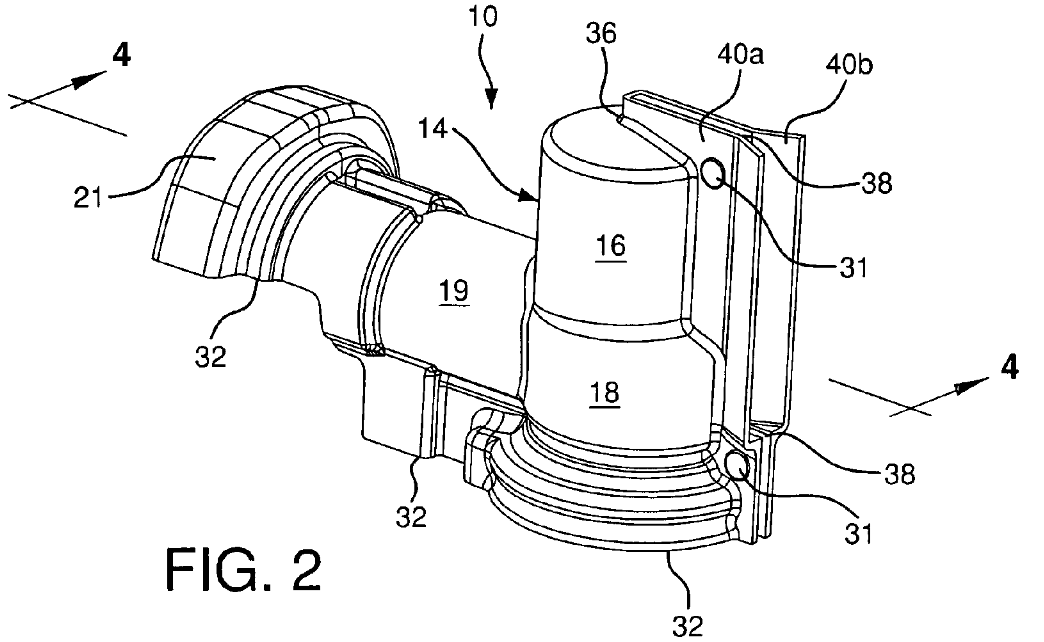
FIG. 2 is a side perspective view of the cover of FIG. 1.
Figure 3:
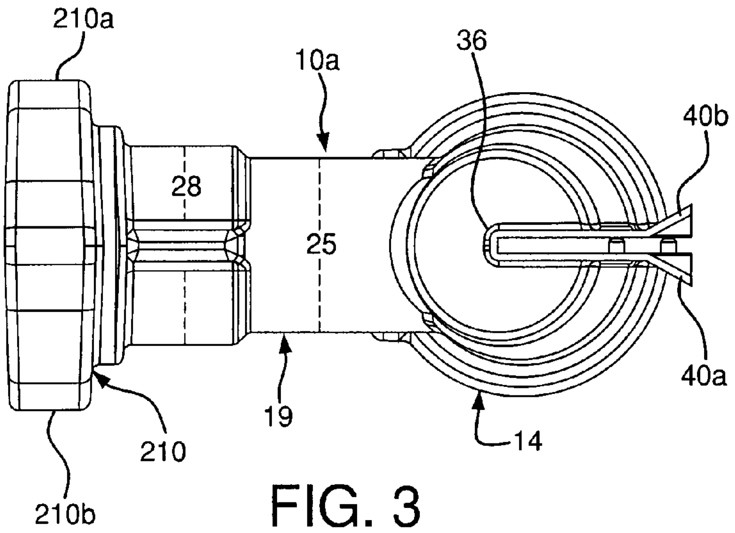
FIG. 3 is a top elevational view of the cover according to a variation of the embodiment of FIGS. 1 and 2.

Turning to FIG. 1, a cutout cover 10 is disposed on a conventional cutout 12 to protect wildlife and linemen from electrical shock and can be applied with a hot-stick capable tool (including the grip-all or clamp style) or rubber gloves (when hot-stick features are featured) to polymer and porcelain cutouts, depending on the structural design of the cover. The cover 10 is made of a flexible and resilient material designed to fit snugly around the cutout 12. The cover 10 includes a hollow top portion 14 with an upper dome 16 and a lower dome 18 for covering a cutout insulator 20 and a slit 38 extending through the domes 16, 18. The cover 10 also includes a substantially open end 21 adapted to receive a cutout top bracket and a middle section 19 connecting the lower dome 18 to the open end 21.

The conventional cutout 12 includes an insulator 20, a fuse link 22, a spring-loaded mechanism 24, a top bracket, a bottom bracket 26, and a connection point on its top and bottom linking the stinger wire from either a tap connector or a surge arrestor. The spring-loaded mechanism 24 holds the cutout 12 together and supports the stinger wire, an exposed portion of the configuration from which wildlife must be protected. The insulator 20 can be porcelain, polymer, or any similar material. Such cutouts are disclosed in U.S. Pat. Nos. 6,392,526, 6,462,639, 6,583,708, and 6,593,842, the subject matters of which are hereby incorporated by reference.

As seen in FIGS. 2-6, the cover 10 is generally boot-shaped having a rounded substantially bell-shaped portion 14, a neck 19, an open end 21, and an open bottom 32. The bell-shaped top portion 14 fits snugly around the top of the insulator 20 and an upper section 34 of the cutout 12. The top portion 14 includes an upper dome 16 with a diameter less than the diameter of a lower dome 18. The top portion 14 is further defined by a longitudinal slit 38 extending along the midline of the top portion 14 starting at the top of the upper dome 16, continuing along the exterior of the top portion 14 to the lower dome 18, and terminating at the open bottom 32.

The cover 10 is preferably made of a soft, flexible material such as rubber, soft plastic, hard plastic with a living hinge 36 or flexible region, or a hard plastic with a spring loaded hinge joint. The living hinge 36 is located at the apex of the slit 38 on the upper dome 16 between the first side 40*a* and the opposing second side 40*b* adjacent the slit 38. The living hinge 36 and the flexibility of the cover material allows the sides 40*a*, 40*b* of the top portion 14 to flex towards and away from the center of the slit 38, but the cover 10 is made with enough resiliency to retain a closed position. This expansion and contraction controlled by the living hinge 36 allows a lineman to position the cover 10 on the cutout 12 with some degree of security.

The middle section or neck portion 19 of the cover 10 is a lengthwise column extending between the lower dome 18 and the open end 21, covering the end of the cutout 12 above the fuse link 22. The neck 19 is narrower than both the top portion 14 and the open end 21 such that it includes a first diameter 25 and a relatively larger second diameter 28 as it extends from the lower dome 18 towards the grab point 13 of the cutout 12 at the open end 21.

The open end 21 is a substantially open wall adapted to access the cutout 12. The open end 21, located adjacent grab point 13, is broadly shaped such that a linemen could easily access the cutout grab point 13 and fuse link 22 without obstruction by the cover 10. There is enough clearance provided by having an open end 21 that the lineman can change the fuse without disrupting or having to remove the cover 10. Interchangeably, the end 21 could preferably be substantially arcuate such as the cover 10 shown in FIG. 2 or the end 210 can be substantially square including two corners 210*a*, 210*b* formed at substantially 90 degree angles as seen in cover 10*a* shown in FIG. 3. Also, the ends 21, 210 could provide an ice shed for cold climate applications.

The bottom 32 of the cover 10 is considerably open-faced and extends along the edge of the entire cover 10, including the substantially bell-shaped top portion 14, the neck 19, and the open end 21. Since the cover 10 protects the top of the cutout 12 from weather damage and reduces the risk of electrical shock to wildlife, it is not necessary for the cover 10 to protect the bottom bracket 26 because wildlife does not typically access the bottom bracket area of the cutout 12.

In this embodiment of the invention, the cover 10 is applied with rubber gloves and includes a fastener mechanism 16 for securing the sides 40*a*, 40*b* of the cover 10 together when the cover 10 is installed atop the cutout 12. The fastener mechanism 16 includes at least one aperture 30 towards the upper dome 16 and/or the bottom dome 18 and fasteners 31. Each aperture 30 is substantially circular and disposed on both sides 40*a*, 40*b* of the slit 38. Each fastener 31 is a push pin holding the sides 40*a*, 40*b* together upon inserting the push pin 31 into the aperture 30 creating a secure friction fit between the push pins 31 and apertures 30.

Figure 4:
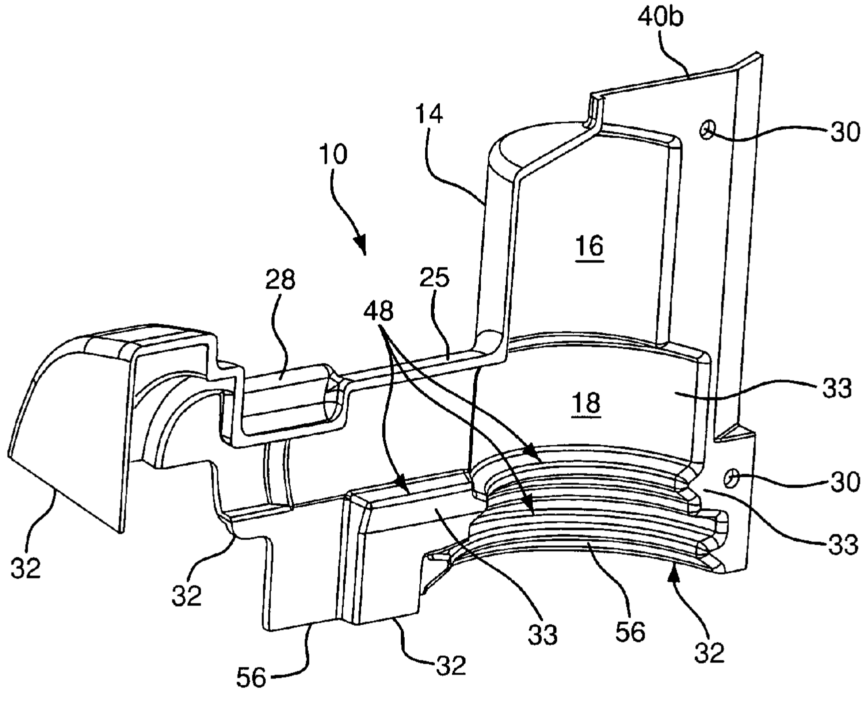
FIG. 4 is a side perspective view in cross section of the cover of FIG. 2.
Figure 5:
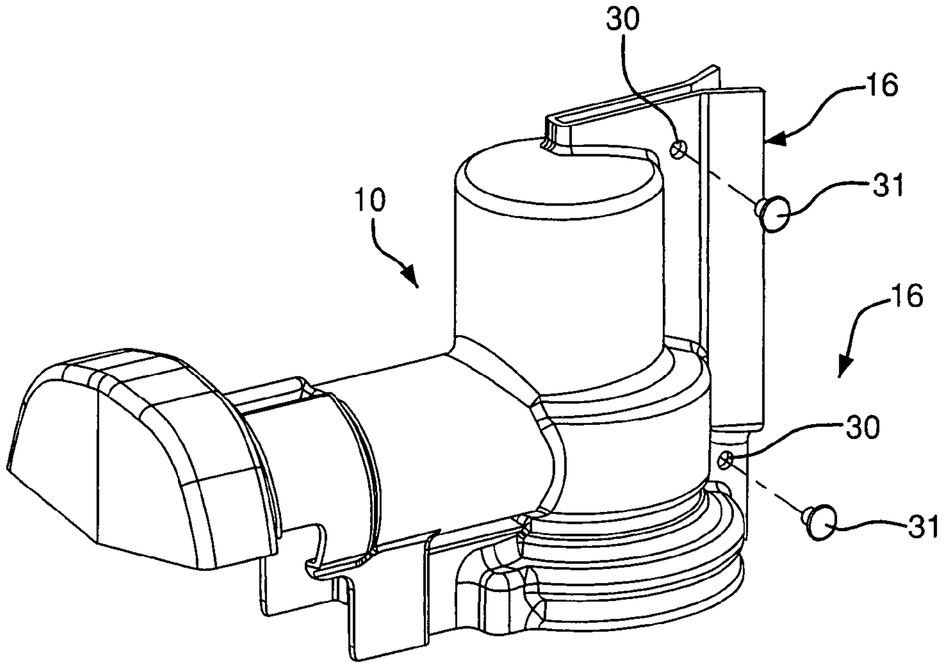
FIG. 5 is a side perspective view of the cover of FIGS. 1-4 prior to installation of fasteners.
Figure 6:
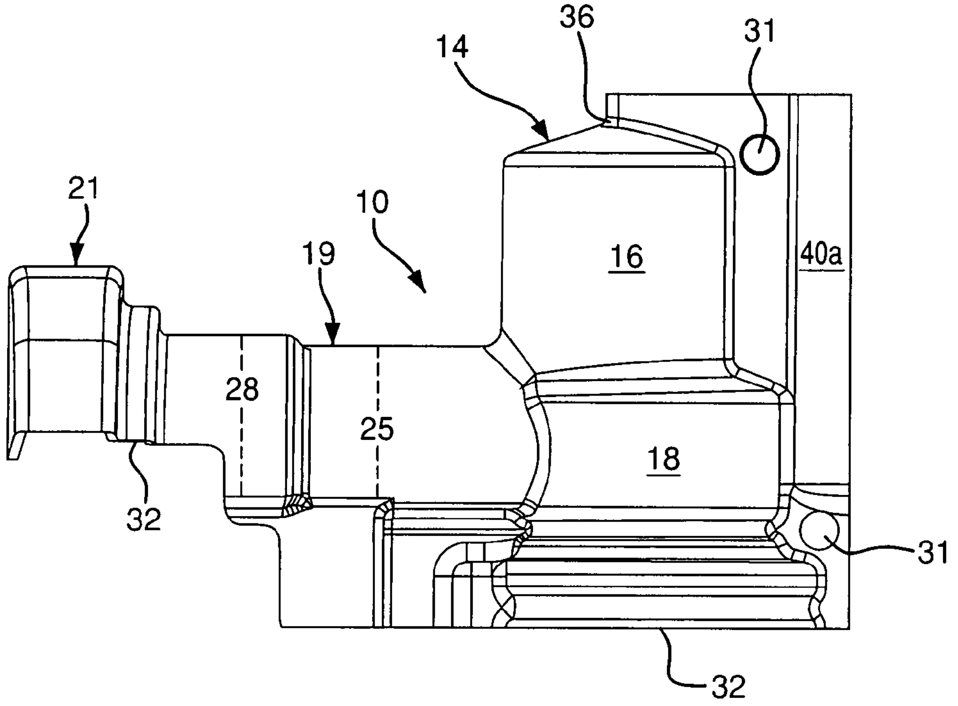
FIG. 6 is a side elevational view of the cover of FIGS. 1-5 with fasteners installed.
Figure 7:
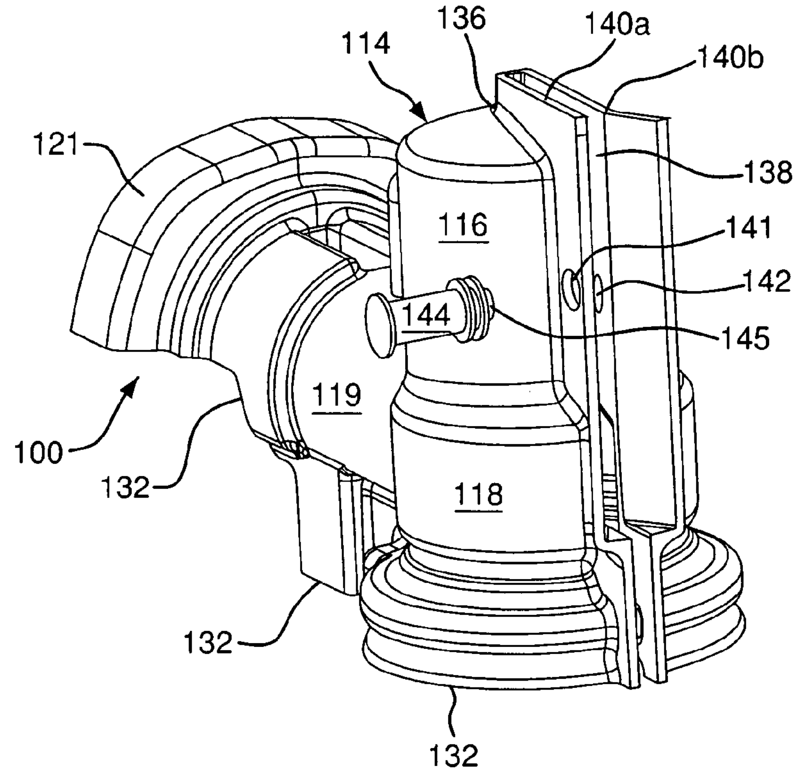
FIG. 7 is a front perspective view of a cutout cover having a plurality of hot-stick features according to a second embodiment of the present invention.
Figure 8:
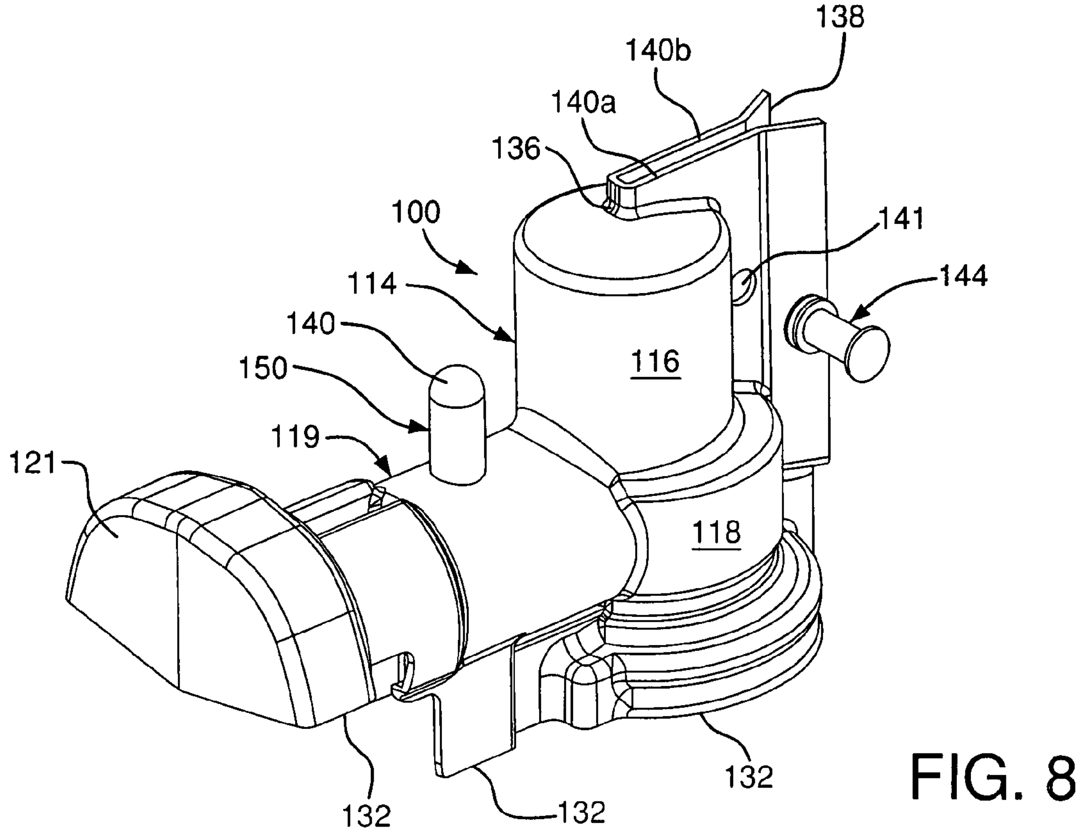
FIG. 8 is a rear perspective view of the cutout cover of FIG. 7 prior to installation of a hot-stick acceptable fastener.
Figure 9:
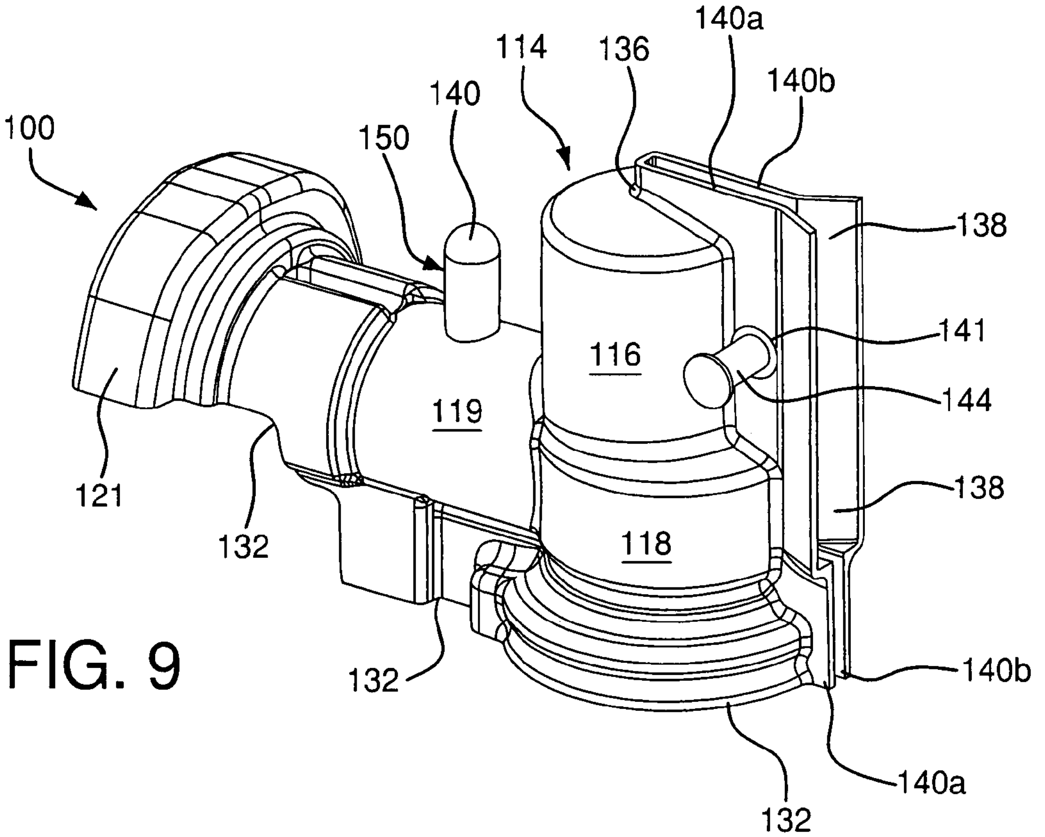
FIG. 9 is a side perspective view of the cutout cover of FIGS. 7 and 8 with the hot-stick acceptable fastener installed.
Figure 10:
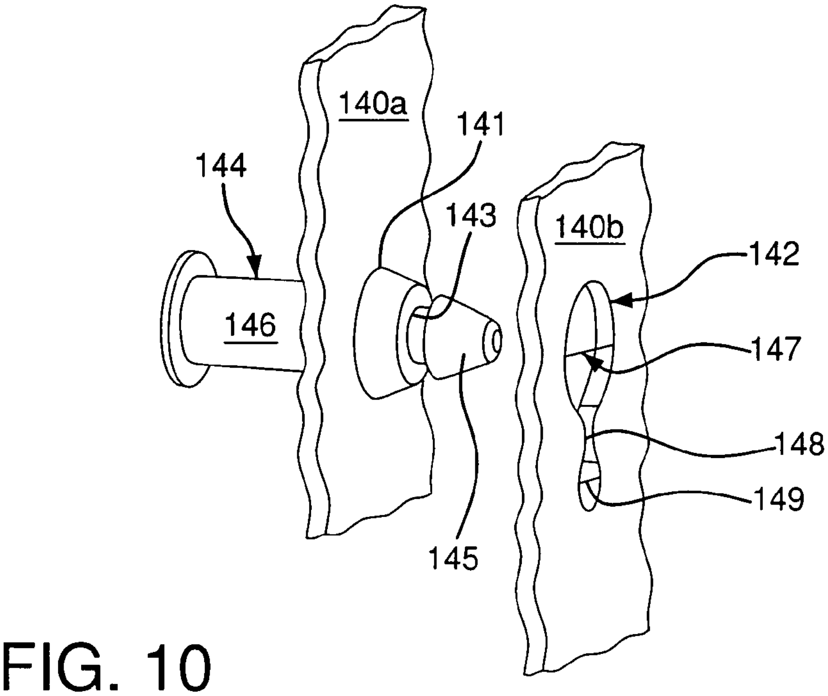
FIGS. 10-13 are enlarged perspective and elevational views of the fastening mechanism of FIGS. 8 and 9.
Figure 11:
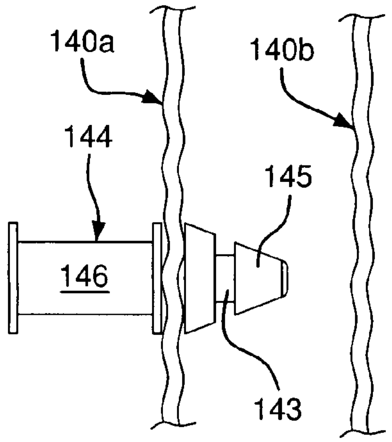
Figure 12:
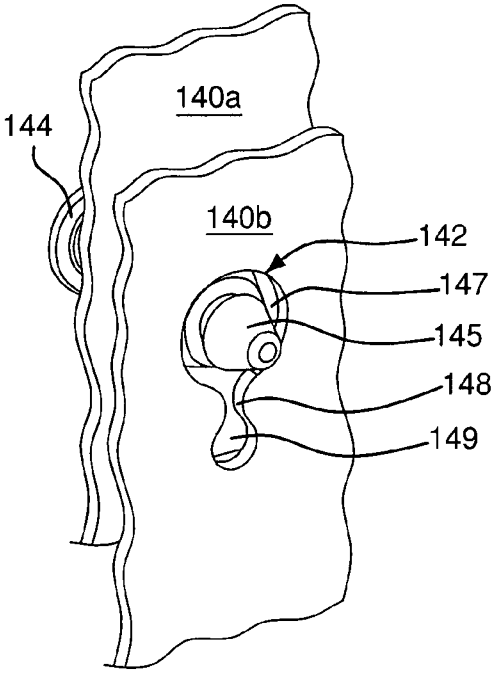
Figure 13:
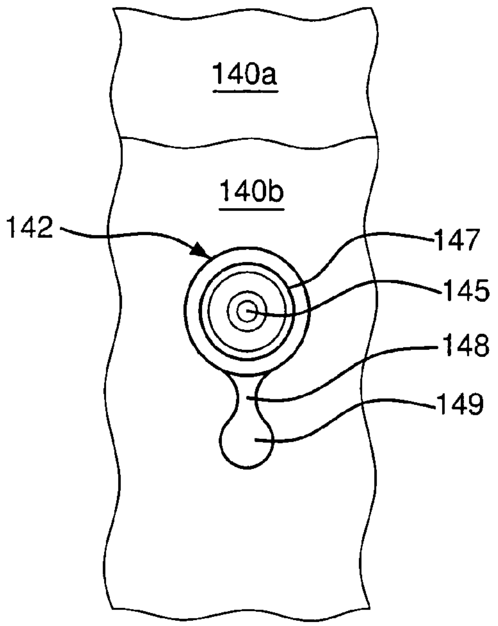

In addition to the fastener mechanism 16, the cover 10 includes catch points that clasp the cover 10 onto the cutout 12 to remain tightly installed, as illustrated in FIG. 4. These catch points or gripping ridges 48, located on the interior 33 of the cover 10 and adjacent the outer rim 56, follow the outline of the same arcuate shape as the bottom 32 of the cover 10. The gripping ridges 48 contact the cutout 12 at a closer position than the outer rim 56 touches the cutout 12. This contact relationship further secures the cover 10 to the cutout 12 because the gripping ridges 48 extend closer towards the cutout 12 than the outer rim 56.

In a second embodiment of the invention, seen in FIGS. 7-13, a cover 100 includes a variety of hot-stick grab points compatible with hot-stick tools for this type of installation. The hot-stick grab points are attachment points for the hot-stick tool so the lineman does not have to touch the cover 100 with his bare hands or rubber gloves. With the cover 10 of the previous embodiment lacking hot-stick grab points, the installer must wear rubber gloves to install the cover 10.

The overall design of this cover 100 is similar to the previous cover 10 with the exception of the hot-stick grab points and the fastener mechanism. Cover 100 includes a handle 150 extending from the neck 119. The grab point 140 is located on the end of the handle 150. The grab point 140 is substantially knob-shaped and projects from the columnar handle 150 towards the upper dome 116 of the cover 100.

The type of fastener mechanism in this embodiment includes a first aperture 141, a second aperture or receiver 142, and a cone-shaped fastener 144. Similar to the first embodiment, the fastener mechanism retains the sides 140*a*, 140*b* in a closed position to withstand the opening and closing motion of the living hinge 136. Moreover, this connection further secures the cover 100 onto the cutout around the top of the insulator and prevents it from sliding off due to weather damage, etc.

First aperture 141 is disposed on side 140*a* of the top portion 114 and includes a substantially circular shape for accepting the cone-shaped fastener 144 and being received in an annular groove in the fastener. The head 145 of the fastener 144 is substantially cone-shaped to glide through the aperture 141 and the slit 138 towards the receiver 142 in the opposing side 140*b*.

The receiver 142 is substantially key-shaped for enabling easy installation of the fastener 144 with a hot-stick tool. The receiver 142 includes a first or wide diameter 147 for the point of contact towards the top of side 140*b* to accept the fastener head 145 upon initial insertion. Once the head 145 is inserted into the receiver 142, the head 145 is guided towards the bottom 132 of the cover 100, into the second or narrow diameter annular groove 149 of the receiver 142 and locked into position.

An outer portion of the fastener 144 contains a recess or neck 143 for accepting one side of the hot-stick tool. The neck 143 is the narrowest portion of the fastener 144 and the only section that fits through the channel 148 into the narrow diameter 149 so that the narrow diameter 149 has a tighter grip around the neck 143 than that of the wide diameter 147.

Another grab point 146 is located on the fastener mechanism at the widest portion of the fastener 144 because it is the easiest section of the fastener 144 to grasp with the hot-stick tool. Preferably, the cover 100 remains in place once it is installed. The clearance at the front of the cover 100 allows access for a lineman to change the fuse. After the fuse link 22 has been reconnected, the lineman situates the cover 100 back together. This way, the head 145 of the fastener 144 is more easily pushed through the side portions 140*a*, 140*b* of the cover 100.

The fastener 144 is shaped as illustrated so there is a substantial amount of material for lineman to grasp with the hot-stick at grab point 146 and enough to manipulate the fastener 144 and cover 100 into a proper position without breaking the fastener 144. If desired, the fastener 144 can be installed in a rubber glove application. Alternatively, the fastener 144 can be pre-installed on side 140*a* to ease installation of the cover 100.

As seen in a third embodiment of the invention, FIGS. 14-17, a load break type cutout can be protected by a cover 200 that is substantially half the size of the cover 10 in the first embodiment. The half-cutout cover 200 is similar to the full cover 10 without the neck 19 connecting to an open section 221. The open section 221 faces the top bracket of the cutout 12. The cover 200 includes an arcuate dome shaped body 262 that can be fitted over the porcelain insulator 20 with the open section 221 positioned over the top bracket.

Further, the top 261 of the cover 200 includes a cross-shaped slit 238 disposed atop the dome shaped portion 262. The bottom 232 of the cover 200 is open faced towards the insulator 20 and opposite the cross-shaped slit 238.

Like the second embodiment, the half-cutout cover 200 is preferably installed and removed with a hot-stick tool. For this to occur, the cover 200 includes a hot-stick grab point 264 located at the top 261 of the cover 200. The grab point 264 is a substantially circular-shaped aperture accessible adjacent to the slit 238 and extending across both sides 240*a*, 240*b* of the cover 200. A hot-stick tool engages the grab point 264, entering through the aperture, and removes the cover 200 from the cutout 12.

The slit 238 is substantially cross-shaped across the top 261 of the cover 200 and includes a longitudinal section along the entire side of the cover 200 extending towards the bottom 232. The shape of the slit 238 allows a greater range of motion than the slit 38, 138 of cover 10, 100 respectively because of the transverse relationship of the cross-shaped section.

The cover 200 further includes the living hinge 236 along the apex 238' of the slit 238 adjacent to the top 261 lengthwise along the midline of the round body 262 between the slit 238 and the door 265 adjacent the top bracket. The hinge 236 operates like the hinge 36 of the first embodiment, by allowing the sides 240*a*, 240*b* adjacent the slit 238 to flex towards and away from the center of the slit 238 so that the cover 200 can remain in the closed position when a fastener mechanism is properly installed.

The fastener mechanism of the half cover 200 embodiment is similar to the fastener mechanism of the first and second embodiments. Each side 240*a*, 240*b* includes at least one aperture 230 towards the top 261 and/or another aperture 230 towards the bottom 232. The aperture 30 is substantially circular and disposed on both sides 240*a*, 240*b* of the slit 238. The aperture 230 is engaged by a push pin fastener 231 adapted to hold the sides of the aperture 230 together by inserting the push pin 231 into the aperture 230 creating a friction fit between the pin and aperture to lock together the two sides 240*a*, 240*b*.

Alternatively, the fastener mechanism could include a hot-stick capable cone-shaped fastener as disclosed in the second embodiment rather than the push pin type fastener of the first embodiment. If using the push pin fastener 231, it would be installed with a rubber glove. If using the cone-shaped fastener, the fastener would be installed with a hot-stick tool.

Figure 14:
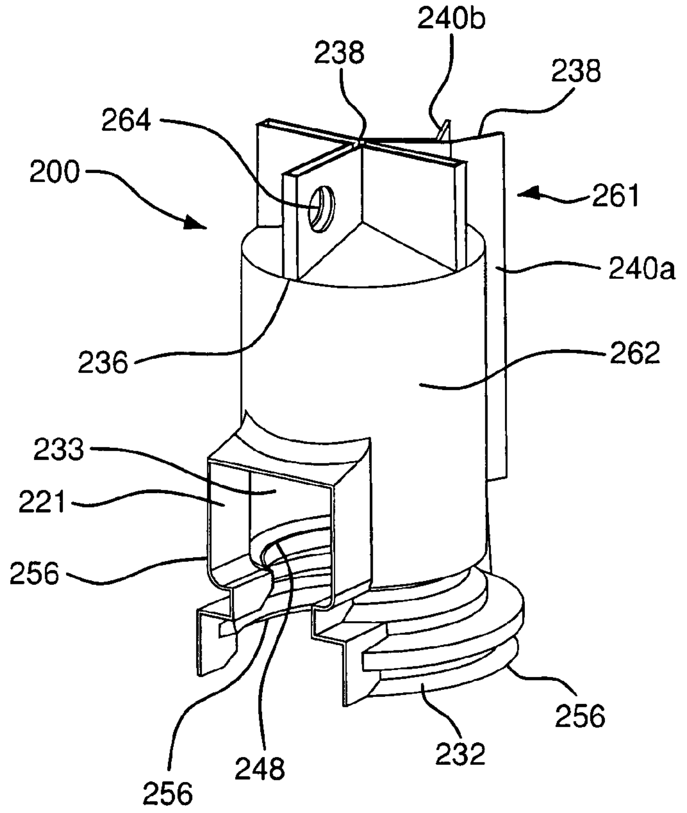
FIG. 14 is a rear perspective view of a cutout cover according to a third embodiment of the present invention.
Figure 15:
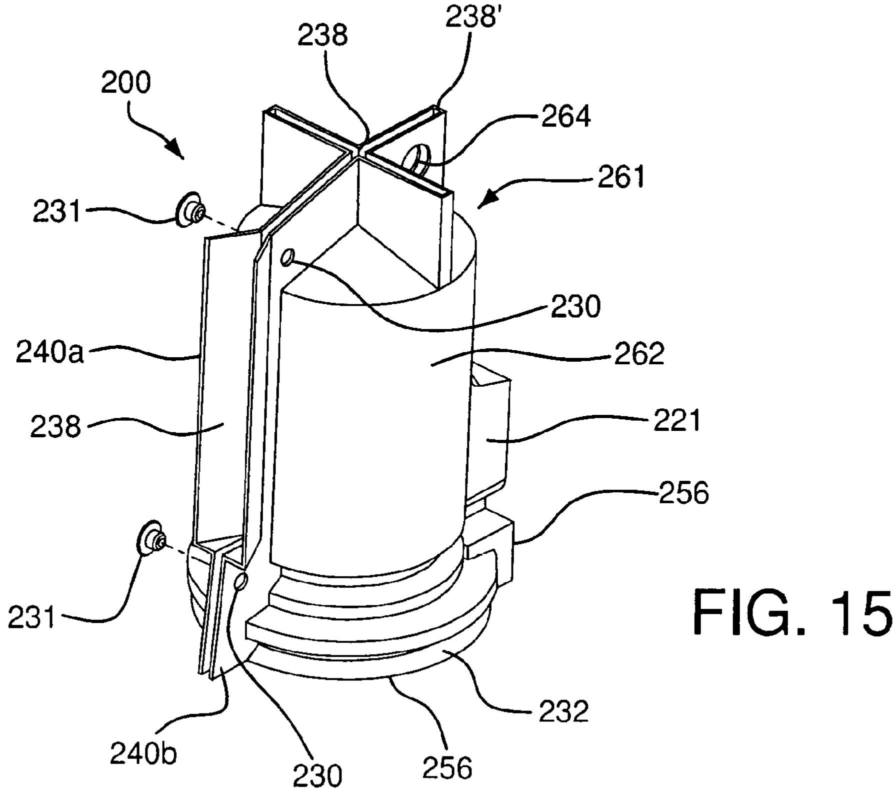
FIG. 15 is a front perspective view of the cutout cover of FIG. 14 with the fasteners prior to installation.
Figure 16:
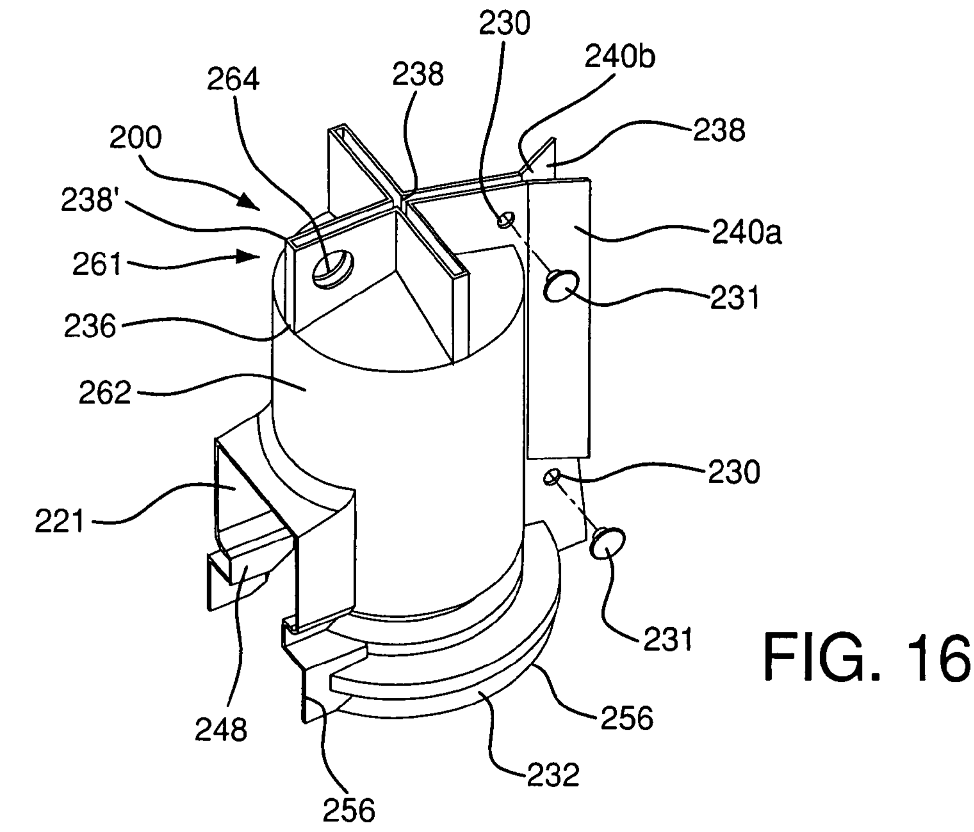
FIG. 16 is a top perspective view of the cutout cover of FIGS. 14 and 15.
Figure 17:
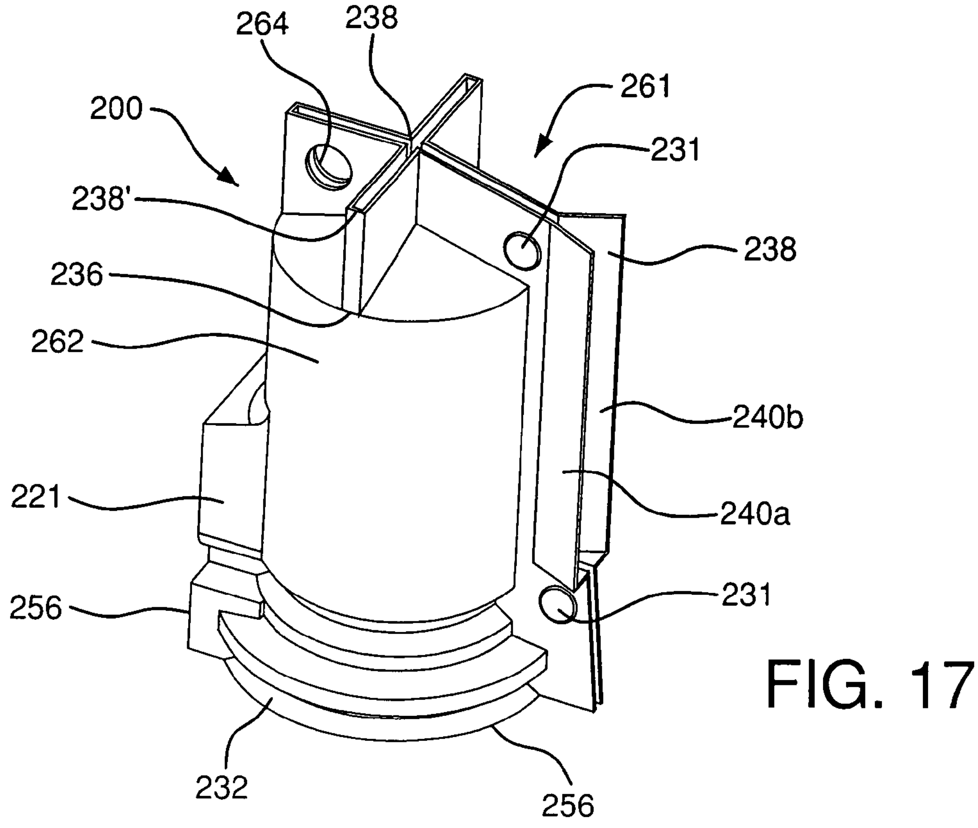
FIG. 17 is a side perspective view of the cutout cover of FIGS. 14-16 after the fasteners have been installed.

In addition to the fastener mechanism, the cover 200 also includes catch points that clasp the cover 200 onto the cutout 12 to remain tightly installed, as illustrated in FIGS. 14 and 16. These catch points or gripping ridges 248, located on the interior 233 of the cover 10 and adjacent the outer rim 256, follow the outline of the same arcuate shape as the bottom 232 of the cover 200. The gripping ridges 248 contact the cutout 12 at a closer position than the outer rim 256 touches the cutout 12. This contact relationship further secures the cover 200 to the cutout 12 because the gripping ridges 248 extend closer towards the cutout 12 than the outer rim 256.

Operation

Regarding the first embodiment, a lineman wearing rubber gloves grabs the cover 10 and secures it over the cutout 12 as shown in FIG. 1. The cover 10 is slid over a stinger wire and into position about the top of the cutout 12. Then, the lineman pulls the cover 10 over the cutout into position, yielding a cover 10 gripping the cutout 12 in multiple locations. The slit 38 transitions from a substantially open position to a substantially closed position because of the resiliency of the cover material. The lineman installs fastener(s) 31 into the aperture(s) 30 towards the top 14 and/or bottom 32 of the cover 10. Each fastener 31 is installed into the aperture 30 creating a secure friction fit between the fastener 31 and the cover 10. This relationship is enough to withstand the opening and closing motion of the sides 40*a*, 40*b* prompted by the living hinge 38. Also, the gripping ridges 48 contact the cutout 12 at a closer position than the outer rim 56 and provide additional support to the cover 10 on the cutout 12.

With respect to the second and third embodiments, the lineman does not need to wear rubber gloves because the covers 100, 200 are equipped with hot-stick grab points. The cover 100 is grabbed by connecting a hot-stick tool to the knob 140 of handle 150 and manipulating the cover. The fastener 144 is pre-installed before mounting on the cutout 12. When locking the cover 100, the lineman grabs the fastener 144 with the hot-stick tool at the grab point 146 (the widest part of the fastener 144) and inserts it into the first aperture 141 of side 140*a*. The fastener 144 is pushed through aperture 141 and inserted into aperture 142. The fastener 144 moves through the wide diameter 147 of aperture 142, guided by its cone-shaped head 145, and pushed through the diameter 147 until the neck 143 is parallel with the aperture 142. When the neck 143 is parallel to the aperture 142, the fastener 144 is slid towards the narrow aperture 149 and the neck 143 glides through the channel 148. This locks the fastener 144 into the aperture 142 and thus, secures the sides 140*a*, 140*b* together to resist the opening and closing motion of the living hinge 138.

In the final embodiment, the cover 200 is installed over the insulator with the open end 221 facing the grab point 13 of the cutout 12 when the hot-stick tool couples to the grab point 264 and positioned. The slit 238 transitions from a substantially open position to a substantially closed position because of the resiliency of the cover material. The lineman installs fastener(s) 231 into the apertures 230 towards the top 261 and/or bottom 232 of the cover 10. Each fastener 231 is installed into the aperture 230 creating a friction fit between the fastener 231 and the cover 200. This relationship is enough to withstand the opening and closing motion of the sides 240*a*, 240*b* prompted by the living hinge 238. Also, the gripping ridges 248 contact the cutout 12 at a closer position than the outer rim 256 and provide additional support to the cover 200 on the cutout 12.

When particular embodiments have been chosen to illustrate the invention, it will be understood by those skilled in the art that various changes and modifications can be made therein without departing from the scope of the invention as defined in the appended claims.

What is claimed is:

1. A cutout cover comprising:
a hollow top portion with an upper dome and a lower dome extending along a longitudinal axis for covering a cutout insulator and with a slit extending through said domes;
a substantially open end adapted to receive a cutout top bracket; and
a middle section connected to said upper dome and extending perpendicularly to said longitudinal axis and radially outwardly from an outer surface of said upper dome and said lower dome.

2. A cutout cover according to claim 1 wherein
said top portion includes first and second opposing sides, each of said sides adjacent said slit.

3. A cutout cover according to claim 2 wherein
a fastener mechanism disposed adjacent to said opposing sides.

4. A cutout cover according to claim 3 wherein
said fastener mechanism includes a fastener and first and second apertures disposed on each of said sides for receiving said fastener.

5. A cutout cover according to claim 4 wherein
said fastener includes a substantially cone-shaped head.

6. A cutout cover according to claim 4 wherein
one of said apertures is substantially key-shaped.

7. A cutout cover according to claim 6 wherein
said key-shaped aperture includes first and second diameters, said first diameter is wider than said second diameter.

8. A cutout cover according to claim 7 wherein
said fastener includes a neck having a width with a size small enough to fit between said first and second diameters.

9. A cutout cover according to claim 2 wherein
said cover is formed of flexible and resilient material; and
a living hinge is disposed on said upper dome between said first and second opposing sides.

10. A cutout cover according to claim 1 wherein
said cover further includes an interior with a plurality of gripping ridges disposed thereon.

11. A cutout cover according to claim 1 wherein
said middle section further includes at least one hot-stick grab point.

12. A cutout cover according to claim 11 wherein
said hot-stick grab point is substantially knob-shaped.

13. A cutout cover according to claim 1 wherein
said cover includes a handle extending from said neck with a substantially knob-shaped grab point projecting towards said upper dome.

14. A cutout cover comprising:
an arcuate dome shaped portion of flexible and resilient material extending along a longitudinal axis having an open end and a middle section extending perpendicularly to said longitudinal axis and radially outwardly from said arcuate dome shaped portion and receiving a cutout top bracket;
a top having a longitudinal slit and a hinge disposed on said arcuate dome shaped portion; and
a bottom opposite said longitudinal slit and said hinge and adjacent said middle section.

15. A cutout cover according to claim 14 wherein:
said cover includes at least one hot-stick grab point disposed on said top.

16. A cutout cover according to claim 15 wherein:
said hot-stick grab point is a substantially circular shaped aperture adjacent to said bottom.

17. A cutout cover according to claim 14 wherein:
said cover further includes first and second sides disposed on opposite sides of said hinge.

18. A cutout cover according to claim 17 wherein:
said cover further includes a fastener mechanism with a fastener and first and second apertures disposed on each of said sides for receiving said fastener.

19. A cutout cover according to claim 18 wherein:
said fastener is a push pin inserting into said apertures.

20. A cutout cover comprising:
an arcuate top portion with an upper dome and a lower dome extending along a longitudinal axis for covering a cutout insulator;
a hinge disposed along said top portion adjacent a longitudinal slit extending along at least one surface of said upper dome;
a middle section extending radially outwardly from said arcuate top portion relative to said longitudinal axis to receive a cutout top bracket; and
a pin extending through said arcuate top portion when in a closed position.

21. A cutout cover according to claim 20 wherein:
said middle section extends perpendicularly to said longitudinal axis away from said lower dome to receive a cutout top bracket.

* * * * *